(12) United States Patent
Jiang et al.

(10) Patent No.: US 10,737,603 B2
(45) Date of Patent: Aug. 11, 2020

(54) HEADREST ASSEMBLY

(71) Applicant: Daimay North America Automotive, Inc., Redford, MI (US)

(72) Inventors: Yingtai Jiang, Shanghai (CN); Jianhua Wang, Novi, MI (US); Guojun Tang, Zhoushan (CN)

(73) Assignee: DAIMAY NORTH AMERICA AUTOMOTIVE, INC., Redford, MI (US)

( * ) Notice: Subject to any disclaimer, the term of this patent is extended or adjusted under 35 U.S.C. 154(b) by 273 days.

(21) Appl. No.: 15/737,989

(22) PCT Filed: Oct. 27, 2016

(86) PCT No.: PCT/CN2016/103497
§ 371 (c)(1),
(2) Date: Dec. 19, 2017

(87) PCT Pub. No.: WO2018/076223
PCT Pub. Date: May 3, 2018

(65) Prior Publication Data
US 2020/0031264 A1  Jan. 30, 2020

(51) Int. Cl.
| B60N 2/80 | (2018.01) |
| B60N 2/806 | (2018.01) |
| B60N 2/812 | (2018.01) |
| B60N 2/815 | (2018.01) |
| B60N 2/832 | (2018.01) |
| B60N 2/859 | (2018.01) |
| B60N 2/874 | (2018.01) |
| B60N 2/844 | (2018.01) |
| B60N 2/853 | (2018.01) |
| F16C 1/18 | (2006.01) |

(52) U.S. Cl.
CPC ............. *B60N 2/874* (2018.02); *B60N 2/844* (2018.02); *B60N 2/853* (2018.02); *F16C 1/18* (2013.01)

(58) Field of Classification Search
CPC ......... B60N 2/844; B60N 2/853; B60N 2/874
USPC .................................................. 297/408, 61
See application file for complete search history.

(56) References Cited

U.S. PATENT DOCUMENTS

| 5,738,411 A * | 4/1998 | Sutton .................. B60N 2/3013 |
| | | 297/408 X |
| 7,118,171 B2 | 10/2006 | Fowler et al. |

(Continued)

FOREIGN PATENT DOCUMENTS

| CN | 101254760 A | 9/2008 |
| CN | 101932474 A | 12/2010 |

(Continued)

OTHER PUBLICATIONS

International Search Report and Written Opinion for International Application No. PCT/CN2016/103497 dated Jul. 21, 2017.

*Primary Examiner* — Rodney B White
(74) *Attorney, Agent, or Firm* — Carlson, Gaskey & Olds, P.C.

(57) ABSTRACT

A headrest assembly according to an exemplary aspect of the present disclosure includes, among other things, a head restraint including a push-button and a cam rotatable by a pull cable. The head restraint is moveable from an upright position to a folded position by movement of the push-button or the cam.

12 Claims, 4 Drawing Sheets

(56) References Cited

U.S. PATENT DOCUMENTS

| | | | |
|---|---|---|---|
| 7,717,516 B2 * | 5/2010 | Sutter, Jr. | B60N 2/856 297/408 X |
| 8,348,347 B2 * | 1/2013 | Willard et al. | B60N 2/844 297/408 |
| 2005/0029853 A1 * | 2/2005 | Gauthier | A47C 7/38 297/408 |
| 2005/0067874 A1 | 3/2005 | Kamrath et al. | |
| 2005/0156456 A1 | 7/2005 | Robinson et al. | |
| 2005/0225146 A1 * | 10/2005 | Sutter, Jr. | B60N 2/876 297/408 |
| 2006/0061187 A1 * | 3/2006 | Gauthier | A47C 1/10 297/408 |
| 2006/0220433 A1 * | 10/2006 | Yetukuri | B60N 2/859 297/408 |
| 2008/0203801 A1 * | 8/2008 | Jammalamadaka | B60N 2/859 297/408 |
| 2009/0179475 A1 * | 7/2009 | Haase | B60N 2/20 297/408 |
| 2009/0243364 A1 * | 10/2009 | Brunner | B60N 2/815 297/408 |
| 2010/0078972 A1 | 4/2010 | Sayama | |
| 2010/0117432 A1 * | 5/2010 | Lutzka | B60N 2/859 297/408 |
| 2010/0133889 A1 * | 6/2010 | Lutzka | B60N 2/3009 297/408 |
| 2011/0101762 A1 * | 5/2011 | Lutzka | B60N 2/859 297/408 |
| 2015/0266401 A1 | 9/2015 | Grable | |
| 2015/0266402 A1 * | 9/2015 | Lutzka | B60N 2/3009 297/408 X |

FOREIGN PATENT DOCUMENTS

| | | |
|---|---|---|
| CN | 102555864 A | 7/2012 |
| CN | 202623994 U | 12/2012 |
| CN | 204340778 U | 5/2015 |

* cited by examiner

HEADREST ASSEMBLY

BACKGROUND

This disclosure relates to a headrest assembly for a seat in a vehicle.

Headrests are configured to be positioned relative to the rear of an occupant's head and/or neck. Headrests thus project from a seat back when in a locked, upright position. Many vehicles include foldable seat backs in order to provide addition room in the vehicle for storage and transport of goods. Before folding a vehicle seat back, headrests are sometimes also folded to prevent interference between the headrest and another vehicle seat, for example.

SUMMARY

A headrest assembly according to an exemplary aspect of the present disclosure includes, among other things, a head restraint including a push-button and a cam rotatable by a pull cable. The head restraint is moveable from an upright position to a folded position by movement of the push-button or the cam.

In a further non-limiting embodiment of the foregoing headrest assembly, the head restraint includes a locking plate and a locking trigger engaged with the locking plate when the head restraint is in the upright position, and the locking trigger is configured to disengage the locking plate in response to movement of the push-button or the cam.

In a further non-limiting embodiment of any of the foregoing headrest assemblies, the push-button is directly coupled to a push-pin, the push-pin is directly coupled to a push-lever, and the push-lever is directly coupled to the locking trigger.

In a further non-limiting embodiment of any of the foregoing headrest assemblies, the push-lever is configured to translate linear movement of the push-pin into rotational movement of the locking trigger.

In a further non-limiting embodiment of any of the foregoing headrest assemblies, the push-lever is pivotable about an axis perpendicular to an axis of rotation of the locking trigger.

In a further non-limiting embodiment of any of the foregoing headrest assemblies, the cam is rotatably moveable in response to movement of a pull-cable connected to the cam.

In a further non-limiting embodiment of any of the foregoing headrest assemblies, the cam is coupled to a cam trigger, the cam trigger is coupled to the locking trigger by a rotatable shaft, and rotational movement of the cam trigger causes rotational movement of the locking trigger.

In a further non-limiting embodiment of any of the foregoing headrest assemblies, the cam is configured to rotate from a resting position by a first amount of rotation to release the locking trigger from the locking plate, and the cam is configured to rotate to by a second amount of rotation greater than the first amount of rotation in response to additional movement of the pull-cable.

In a further non-limiting embodiment of any of the foregoing headrest assemblies, the second amount of rotation is about 40° than greater the first amount of rotation.

In a further non-limiting embodiment of any of the foregoing headrest assemblies, the cam includes a flat surface, and the cam trigger is engaged with the flat surface from a resting position until the cam is rotated by the first amount of rotation.

A seat for a motor vehicle according to an exemplary aspect of the present disclosure includes, among other things, a seat back, a pull-cable, and a headrest assembly. The headrest assembly includes a head restraint including a push-button and a cam rotatable by a pull cable. The head restraint is moveable from an upright position to a folded position by movement of the push-button or the cam. The seat further includes an actuator configured to pull the pull-cable to move the head restraint to a folded position and to fold the seat back.

In a further non-limiting embodiment of the foregoing seat, the head restraint includes a locking plate and a locking trigger engaged with the locking plate when the head restraint is in the upright position, and the locking trigger is configured to disengage the locking plate in response to movement of the push-button or the cam.

In a further non-limiting embodiment of any of the foregoing seats, the push-button is directly coupled to a push-pin, the push-pin is directly coupled to a push-lever, and the push-lever is directly coupled to the locking trigger.

In a further non-limiting embodiment of any of the foregoing seats, the push-lever is configured to translate linear movement of the push-pin into rotational movement of the locking trigger.

In a further non-limiting embodiment of any of the foregoing seats, the push-lever is pivotable about an axis perpendicular to an axis of rotation of the locking trigger.

In a further non-limiting embodiment of any of the foregoing seats, the cam is rotatably moveable in response to movement of a pull-cable connected to the cam.

In a further non-limiting embodiment of any of the foregoing seats, the cam is coupled to a cam trigger, the cam trigger is coupled to the locking trigger by a rotatable shaft, and rotational movement of the cam trigger causes rotational movement of the locking trigger.

In a further non-limiting embodiment of any of the foregoing seats, the cam is configured to rotate from a resting position by a first amount of rotation to release the locking trigger from the locking plate, and the cam is configured to rotate to by a second amount of rotation greater than the first amount of rotation in response to additional movement of the pull-cable.

In a further non-limiting embodiment of any of the foregoing seats, the second amount of rotation is about 40° than greater the first amount of rotation.

In a further non-limiting embodiment of any of the foregoing seats, the cam includes a flat surface, and the cam trigger is engaged with the flat surface from a resting position until the cam is rotated by the first amount of rotation.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure generally relates to a headrest assembly. The headrest assembly includes a head restraint including a push-button and a cam rotatable by a pull cable. The head restraint is moveable from an upright position to a folded position by movement of the push-button or the cam. The disclosed arrangement provides two ways to fold a head restraint, and can further be integrated with another assembly, such as a seat back folding assembly. The disclosed arrangement provides a relatively compact arrangement leading to reduced cost and increased manufacturability.

Figure 1:
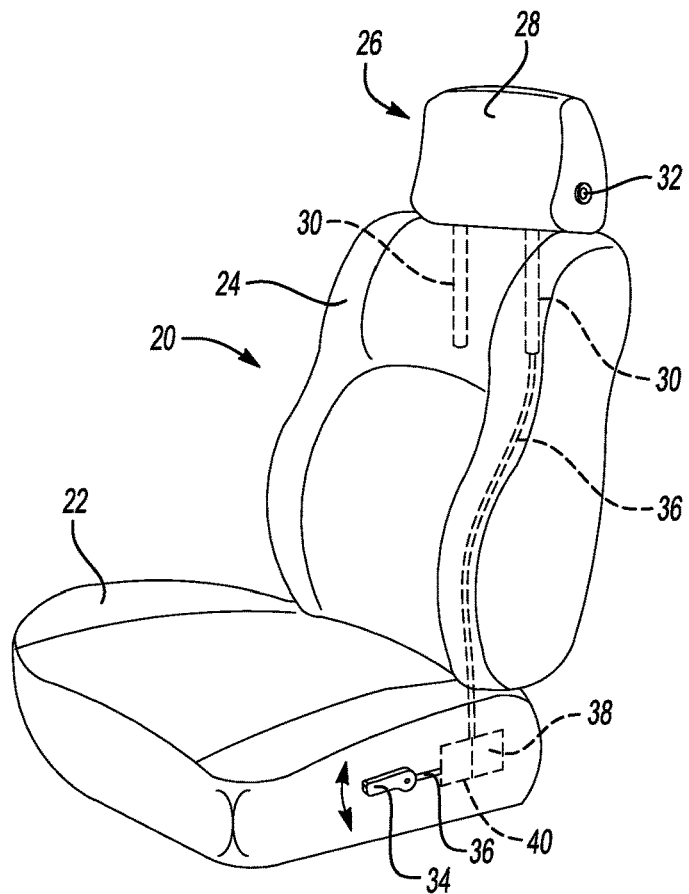
FIG. 1 is a perspective view of a seat including an example headrest assembly.

FIG. 1 illustrates an example seat 20 for a motor vehicle. The seat 20 in this example includes a base 22, a seat back 24, and a headrest assembly 26. The headrest assembly 26 includes a head restraint 28 and a rod 30. In this example, the head restraint 28 is moveable between an upright position (e.g., FIGS. 1 and 2) and a folded position (FIG. 3). In this example, the head restraint 28 includes a push-button 32 which, when depressed, allows movement of the head restraint 28 between the upright and folded positions.

The seat 20 also includes an actuator 34, which in this case is a lever, coupled to a pull-cable 36. The actuator 34 is rotatable by an occupant (e.g., user) of the seat 20 or another user. When rotated, the actuator 34 also allows movement of the head restraint 28 between the upright and folded positions. Thus, a user has the option of adjusting a position of the head restraint 28 using either the push-button 32 or the actuator 34. In this example, the actuator 34 is connected to the seat base 22, but it should be understood that the actuator 34 could be provided at other locations on the seat 20, or could be provided at a location spaced-apart from the seat 20.

The pull-cable 36 in this example includes one or more pull-cables. Example pull-cables include Bowden cables. The pull-cable 36 may be connected to a compensator assembly 38 in one example to allow interaction between the pull-cable 36 and other actuation systems associated with the seat 20. For example, the seat 20 may include a seat folding assembly 40 configured to fold the seat back 24 relative to the base 22. The seat folding assembly 40 may be activated by rotation of the actuator 34 in some examples. In one example of this disclosure, rotation of the actuator 34 provides for movement of the head restraint 28 from an upright position to the folded position, and also provides for folding of the seat back 24.

Figure 2:
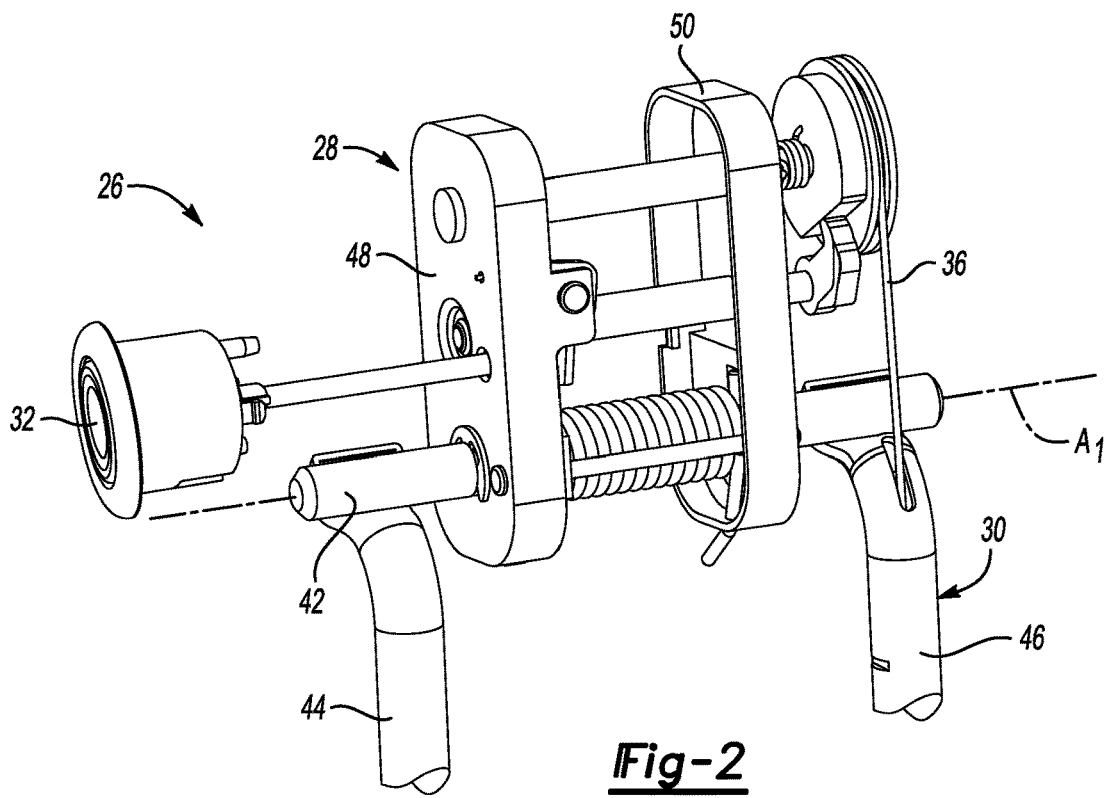
FIG. 2 is a perspective view of an example headrest assembly in an upright position.
Figure 3:
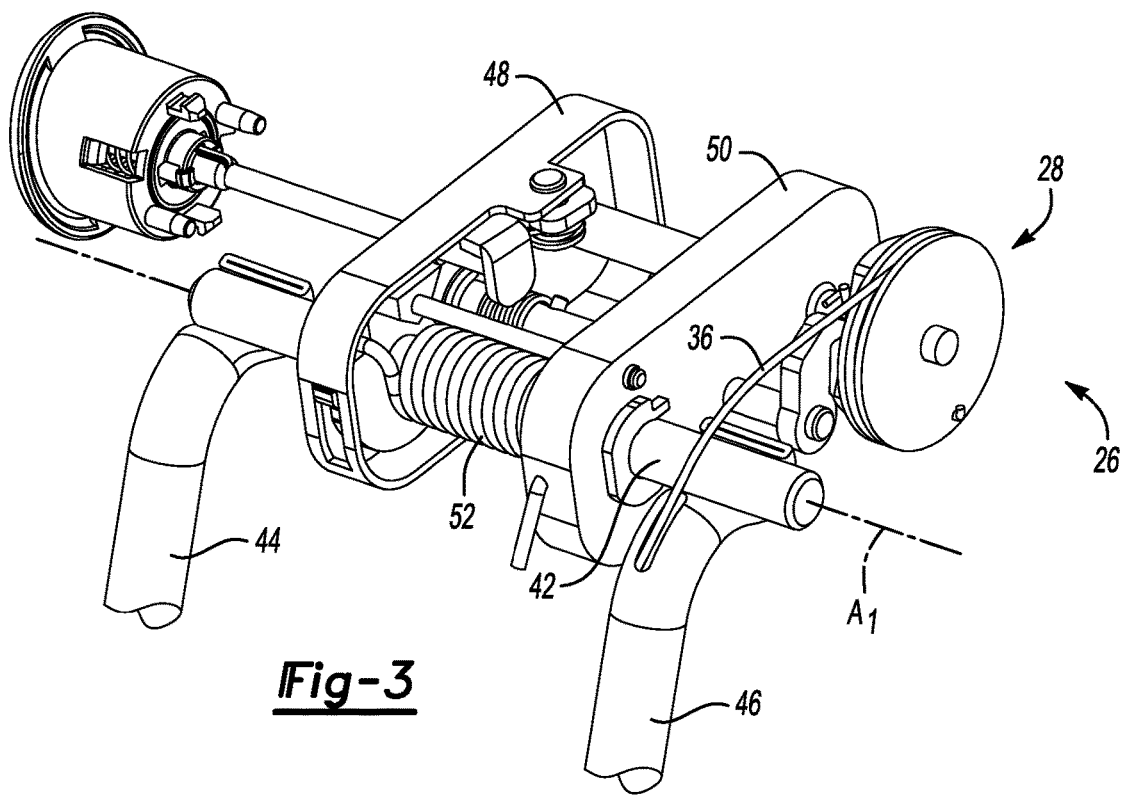
FIG. 3 is a perspective view of the example headrest assembly in a folded position.

FIG. 2 is a perspective view illustrating an example arrangement of the head restraint 28 in an upright position. In FIG. 2, the internal components of the head restraint 28 are illustrated. While not illustrated in FIG. 2, head restraint 28 is configured to support a cushion and an encasement. FIG. 1 shows the head restraint 28 supporting a cushion, which may include foam encased in fabric, such as leather or cloth.

The head restraint 28 is configured for rotation about a horizontal portion 42 of the rod 30, which in this example is supported by vertical portions 44, 46 of the rod 30. The head restraint 28 includes first and second support plates 48, 50 spaced-apart from one another along the horizontal portion 42 of the rod 30. The horizontal portion 42 of the rod 30 is provided with a longitudinal axis $A_1$ extending along a length of the horizontal portion 42. The first and second support plates 48, 50 are configured to rotate about the axis $A_1$ between the upright and folded positions.

FIG. 3 illustrates the head restraint in a folded position. In FIG. 3, the horizontal portion 42 of the rod 30 has rotated about the axis $A_1$ relative to the upright position. In one example, the head restraint 28 rotates in a rearward direction (e.g., away from the occupant space provided by the seat 20) when moving from the upright position to the folded position. In another example, the head restraint rotates in a forward direction.

The head restraint 28 in this example is biased toward the folded position by way of a first biasing member 52. The first biasing member 52 is, in this example, a coil spring disposed about the horizontal portion 42 of the rod 30.

Figure 4:
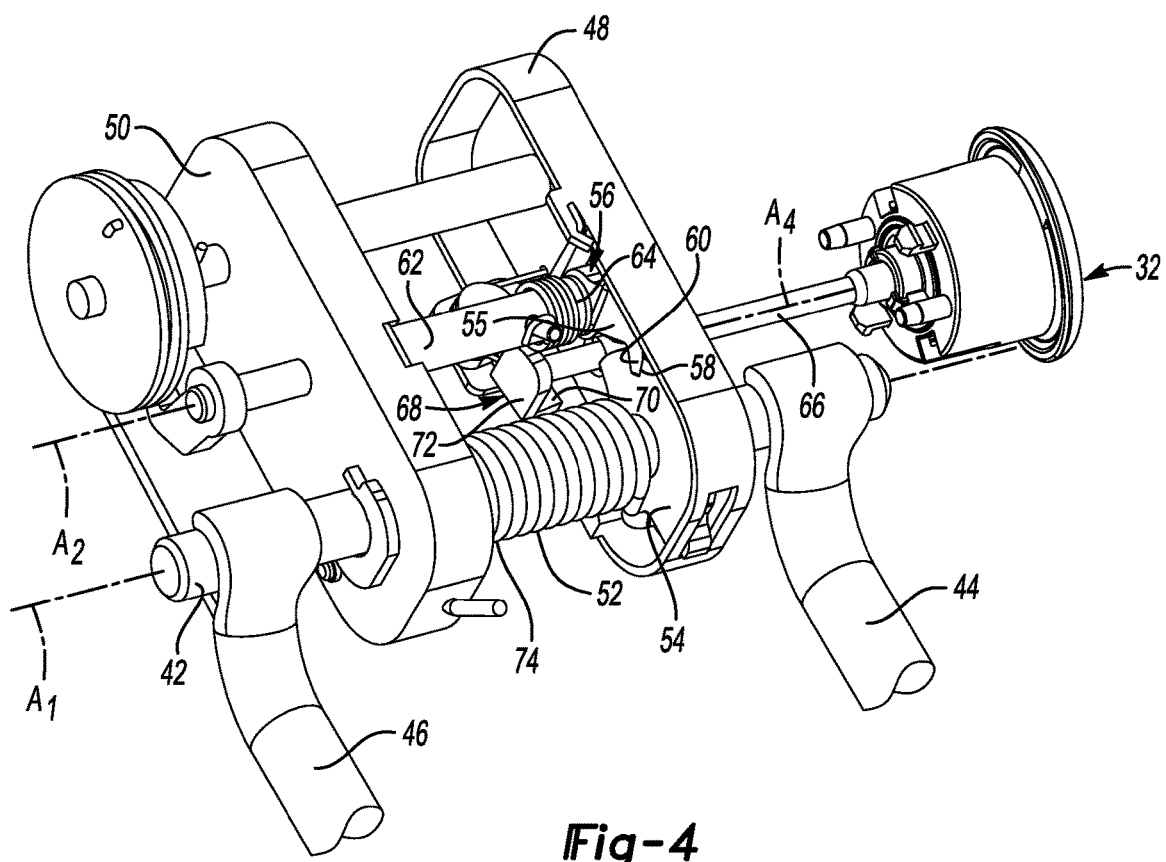
FIG. 4 is a bottom-perspective view of the example headrest assembly, and illustrates the detail of the push-button arrangement.
Figure 5:
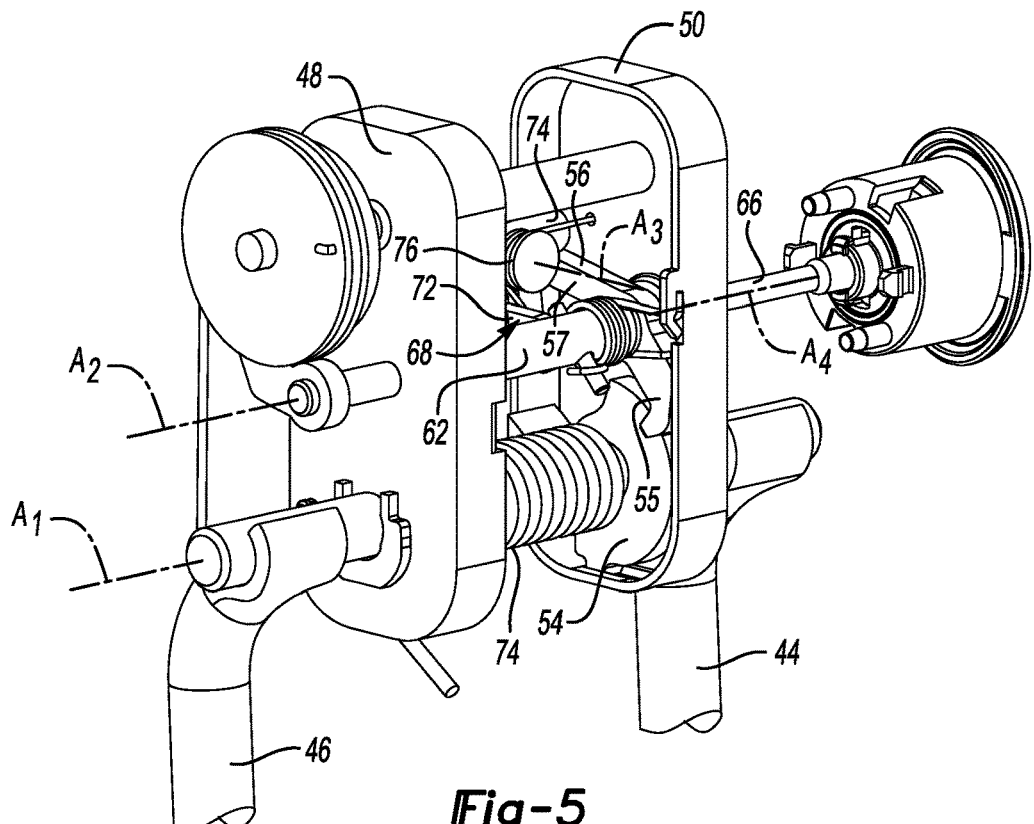
FIG. 5 is a side-perspective view of the example headrest assembly, and illustrates the detail of the push-button arrangement.

With joint reference to FIGS. 4 and 5, the head restraint 28 is held in the upright position against the bias of the first biasing member 52 by a locking plate 54 and a locking trigger 56. In this example, the locking trigger 56 includes a first arm 55 and a second arm 57. The locking plate 54 includes a notch 58 configured to receive a tooth 60 of the locking trigger 56. The tooth 60, in this example, projects from the first arm 55. When in the upright position, the locking trigger 56 is engaged with the locking plate 54 such that the tooth 60 is received in the notch 58. While a tooth and notch are illustrated in this example, other forms of engagement between the locking trigger and locking plate come within the scope of this disclosure.

In this example, the locking plate 54 is mounted to the first support plate 48, and the locking trigger 56 is mounted to a rotatable shaft 62. The rotatable shaft 62 is mounted for rotation relative to the first and second support plates 48, 50 about a longitudinal axis $A_2$ thereof. The axis $A_2$ is spaced-apart from, and substantially parallel to, the axis $A_1$.

The locking trigger 56 is rotationally biased about the axis $A_2$ toward the notch 58 of the locking plate 54 by a second biasing member 64. The second biasing member in this example is a coil spring provided about the rotatable shaft 62.

The locking trigger 56 is configured to disengage the locking plate 54 in response to movement of the push-button 32 or the pull-cable 36. With respect to the push-button 32, the push-button 32 is directly coupled to a push-pin 66 in this example. The push-pin 66 has a longitudinal axis $A_4$ and is configured to move in a direction parallel to the axis $A_4$ when the push-button 32 is depressed. The axis $A_4$ is substantially parallel to the axes $A_1$, $A_2$. Opposite the push-button, the push-pin 66 is directly coupled to a push-lever 68.

The push-lever 68 is configured to translate linear movement of the push-pin 66 into rotational movement of the locking trigger 56 about the axis $A_2$. In this example, the push-lever 68 is mounted to the first support plate 48 for rotation about an axis $A_3$. The axis $A_3$ is substantially perpendicular to the axes $A_1$, $A_2$. On one side of the axis $A_3$, the push-lever 68 includes a first arm 70 which supports a push-plate 72. The push-plate 72 is substantially planar and defines a plane substantially perpendicular to a longitudinal axis $A_4$ of the push-pin 66. As the push-pin 66 moves along the axis $A_4$, the push-pin 66 pushes the push-plate 72, which results in rotation of the push-lever 68 about the axis $A_3$.

Opposite the first arm 70, the push-lever 68 includes a second arm 74 directly coupled to the second arm 57 of the locking trigger 56. The push-lever 68 is biased away from the locking trigger 56 by a third biasing member 76. The third biasing member 74 is a coil spring provided about axis $A_3$ in this example. When the push-button 32 is depressed, the push-pin 66 rotates the push-lever 68 about axis $A_3$ against the third biasing member 74, which causes the locking trigger 56 to rotate about the axis $A_2$ such that the locking trigger 56 disengages the locking plate 54. In this way, depression of the push-button 32 allows the head restraint 28 to move from an upright position to the folded position.

Figure 6:
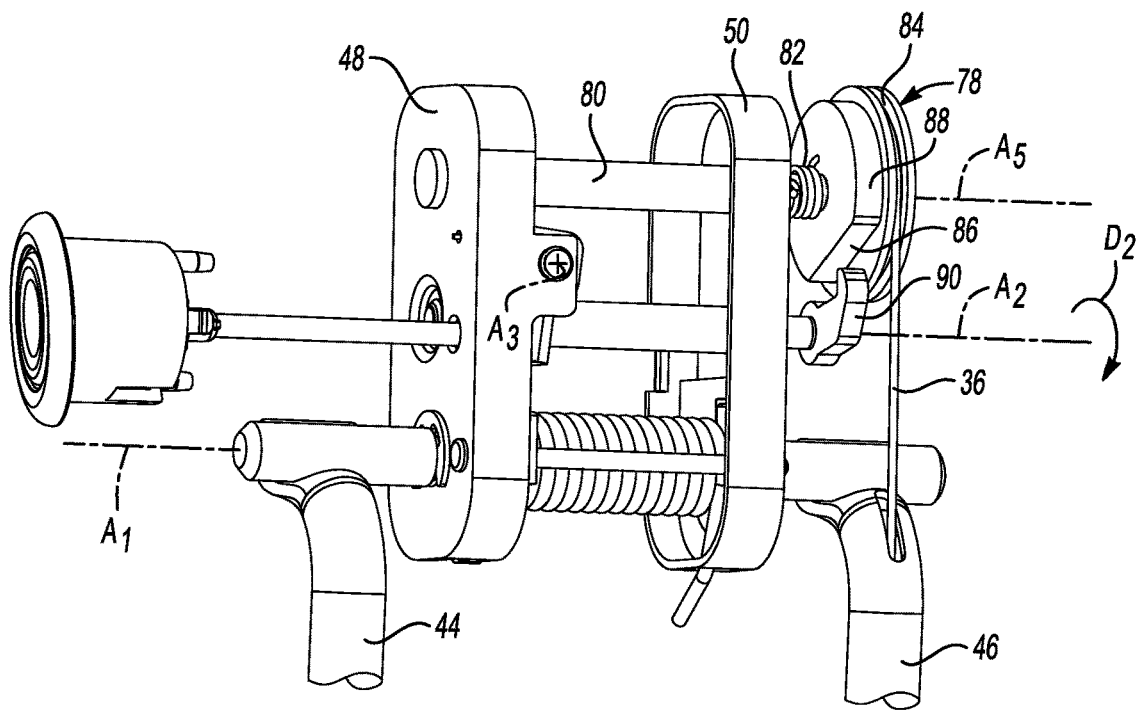
FIG. 6 is a perspective view of the example headrest assembly, and illustrates the detail of the cam and pull-cable arrangement.
Figure 7:
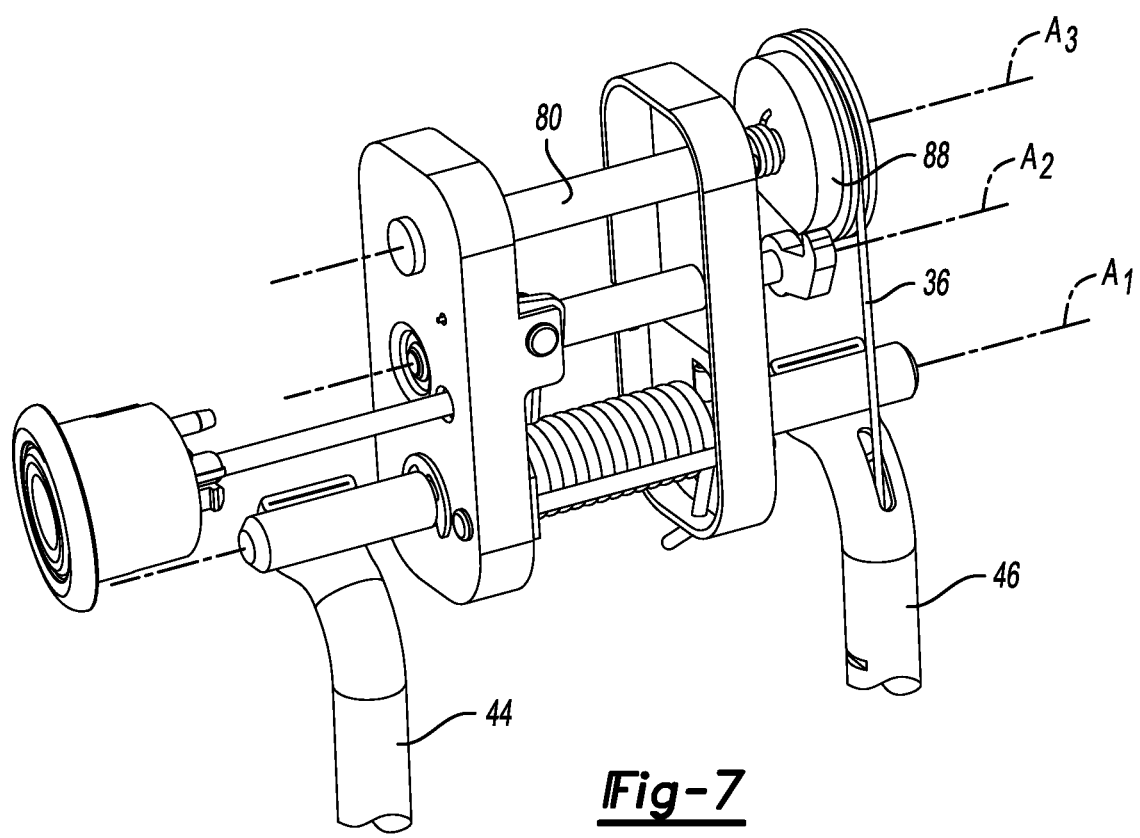
FIG. 7 is a perspective view of the example headrest assembly, and also illustrates the detail of the cam and pull-cable arrangement.

Now referring to FIGS. 6 and 7, an example arrangement allowing the head restraint 28 to move between the upright position and the folded position by movement of the pull-cable 36 will now be described. In this example, the pull-cable 36 is connected at one end to the actuator 34 and, if present, the compensator assembly 38, for example. At an opposite end, the pull-cable 36 is connected to a cam 78. Between the actuator 34 and the cam 78, the pull-cable is routed through the seat 20. In this example, a portion of the pull-cable 36 is routed through an interior of one of the vertical portions 46 of the rod 30.

The cam 78 is mounted for rotation about a shaft 80. The shaft 80 is mounted to the first and second support plates 48, 50, and extends outside (i.e., to the right of, relative to FIG. 6) the second support plate 50. The cam 78 is likewise mounted to the shaft 80 at a location outside the second support plate 50 in this example.

The cam 78 is configured to rotate about a longitudinal axis $A_5$ of the shaft 80 in response to movement of the pull-cable 36. The axis $A_5$ is substantially parallel to the axes $A_1, A_2$, and $A_4$. The cam 78 is biased to a resting position by a fourth biasing member 82. In this example, the fourth biasing member 82 is a coil spring provided about the axis $A_5$.

The cam 78 in this example includes a spool 84 configured to receive the pull-cable 36, and wind the pull-cable 36 about the cam 78, as necessary. The cam 78 also includes a flat 86 surface and an arcuate surface 88. The flat surface 86 and arcuate surface 88 are configured to engage a cam trigger 90.

The cam trigger 90 is mounted to the rotatable shaft 62 at an end opposite the locking trigger 56 such that rotation of the rotation of the cam trigger 90 rotates the locking trigger 56. The cam trigger 90 includes an arm 92 coupled to the cam 78. The arm 92 of the cam trigger 90 is rotationally biased toward the flat 86 surface and arcuate surface 88, and essentially follows the flat 86 surface and arcuate surface 88 as the cam 78 rotates.

When the head restraint is in the upright position, the arm 92 is directly coupled to the flat 86 surface, as shown in FIG. 5. On the other hand, when the actuator 34 is pulled, the cam 78 rotates about the axis $A_5$ under the force of the pull-cable 36. The interaction between the cam 78 and the cam trigger 90 results in movement of the cam trigger 90 about the axis $A_2$. The cam 78 is configured to rotate from the resting position by a first amount of rotation to release the locking trigger 56 from the locking plate 54. In one example, the first amount of rotation corresponds to a position where the cam 78 has been rotated such that the arm 92 of the cam trigger 90 directly contacts the arcuate surface 88, as shown in FIG. 7. In the position of FIG. 7, the locking trigger 56 and the locking plate 54 are disengaged, and the head restraint 28 is allowed to rotate from the upright position to the folded position.

Even after the head restraint 28 has been rotated to the folded position, the cam 78 is configured to rotate beyond the first amount. In one example, the cam 78 is configured to rotate by a second amount of rotation greater than the first amount of rotation in response to additional movement of the pull-cable 36. In this example, the cam 78 is configured to rotate about an additional 40° beyond the first amount of rotation. This additional 40° of rotation allows the disclosed headrest assembly 26 to be incorporated into another system of the vehicle and/or seat 20 that may also employ pull-cables, such as a seat folding system 40. The additional rotation does not further rotate the head restraint 28, and only results in additional rotation of the cam 78. Thus, the headrest assembly 26 can easily be incorporated into other systems associated with the vehicle and/or seat 20.

It should be understood that terms such as "outside," "forward," "rearward," "vertical," and "horizontal" are used above with reference to the normal, upright position of a car seat in a vehicle. These terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A headrest assembly, comprising: a head restraint including a push-button and a cam rotatable by a pull cable, wherein the head restraint is moveable from an upright position to a folded position by movement of the push-button or movement of the cam caused by application of a pulling force onto the pull cable;
   wherein the head restraint includes a locking plate and a locking trigger engaged with the locking plate when the head restraint is in the upright position, and
   wherein the locking trigger is configured to disengage the locking plate in response to movement of the push-button or the cam,
   wherein the push-button is directly coupled to a push-pin,
   wherein the push-pin is directly coupled to a push-lever,
   wherein the push-lever is directly coupled to the locking trigger,
   wherein the push-lever is configured to translate linear movement of the push-pin into rotational movement of the locking trigger, and
   wherein the push-lever is pivotable about an axis perpendicular to an axis of rotation of the locking trigger.

2. The headrest assembly as recited in claim 1, wherein the cam is rotatably moveable in response to movement of a pull-cable connected to the cam.

3. A headrest assembly, comprising:
   a head restraint including a push-button and a cam rotatable by a pull cable, wherein the head restraint is moveable from an upright position to a folded position by movement of the push-button or movement of the cam caused by application of a pulling force onto the pull cable, the head restraint includes a locking plate and a locking trigger engaged with the locking plate when the head restraint is in the upright position, and the locking trigger is configured to disengage the locking plate in response to movement of the push-button or the cam, wherein the cam is rotatably moveable in response to movement of a pull-cable connected to the cam, wherein the cam is coupled to a cam trigger, wherein the cam trigger is coupled to the locking trigger by a rotatable shaft, and wherein rotational movement of the cam trigger causes rotational movement of the locking trigger.

4. A headrest assembly, comprising:

a head restraint including a push-button and a cam rotatable by a pull cable;

wherein the head restraint is moveable from an upright position to a folded position by movement of the push-button or the cam, wherein the head restraint includes a locking plate and a locking trigger engaged with the locking plate when the head restraint is in the upright position, wherein the locking trigger is configured to disengage the locking plate in response to movement of the push-button or the cam, wherein the cam is rotatably moveable in response to movement of a pull-cable connected to the cam, wherein the cam is coupled to a cam trigger, wherein the cam trigger is coupled to the locking trigger by a rotatable shaft:

wherein rotational movement of the cam trigger causes rotational movement of the locking trigger, wherein the cam is configured to rotate from a resting position by a first amount of rotation to release the locking trigger from the locking plate, and wherein the cam is configured to rotate to by a second amount of rotation greater than the first amount of rotation in response to additional movement of the pull-cable.

5. The headrest assembly as recited in claim 4, wherein the second amount of rotation is about 40° greater than the first amount of rotation.

6. The headrest assembly as recited in claim 5, wherein:

the cam includes a flat surface, and the cam trigger is engaged with the flat surface from a resting position until the cam is rotated by the first amount of rotation.

7. A seat for a motor vehicle, comprising:

a seat back;

a pull-cable;

a headrest assembly, comprising:

a head restraint including a push-button and a cam rotatable by a pull cable, wherein the head restraint is moveable from an upright position to a folded position by movement of the push-button or the cam; and an actuator configured to pull the pull-cable to move the head restraint to a folded position and to fold the seat back, wherein the head restraint includes a locking plate and a locking trigger engaged with the locking plate when the head restraint is in the upright position, wherein the locking trigger is configured to disengage the locking plate in response to movement of the push-button or the cam, wherein the push-button is directly coupled to a push-pin, wherein the push-pin is directly coupled to a push-lever, wherein the push-lever is directly coupled to the locking trigger, wherein the push-lever is configured to translate linear movement of the push-pin into rotational movement of the locking trigger, and wherein the push-lever is pivotable about an axis perpendicular to an axis of rotation of the locking trigger.

8. The seat as recited in claim 7, the cam is rotatably moveable in response to movement of a pull-cable connected to the cam.

9. The seat as recited in claim 8, wherein:

the cam is coupled to a cam trigger, the cam trigger is coupled to the locking trigger by a rotatable shaft, and rotational movement of the cam trigger causes rotational movement of the locking trigger.

10. The seat as recited in claim 9, wherein:

the cam is configured to rotate from a resting position by a first amount of rotation to release the locking trigger from the locking plate, and the cam is configured to rotate to by a second amount of rotation greater than the first amount of rotation in response to additional movement of the pull-cable.

11. The seat as recited in claim 10, wherein the second amount of rotation is about 40° greater than the first amount of rotation.

12. The seat as recited in claim 11, wherein:

the cam includes a flat surface, and the cam trigger is engaged with the flat surface from a resting position until the cam is rotated by the first amount of rotation.

\* \* \* \* \*